A. CHAMBERS.
CLUTCH CONTROL MECHANISM.
APPLICATION FILED MAR. 31, 1915.
1,244,468.
Patented Oct. 30, 1917.
2 SHEETS—SHEET 1.
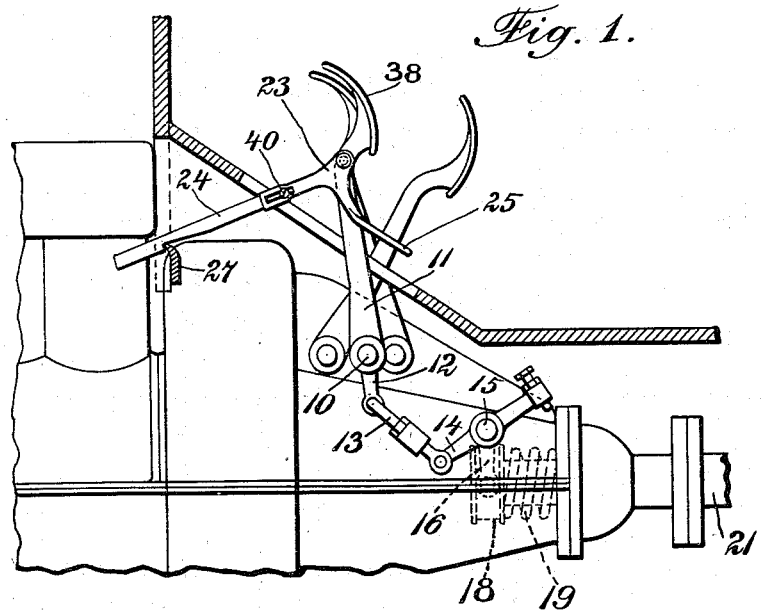
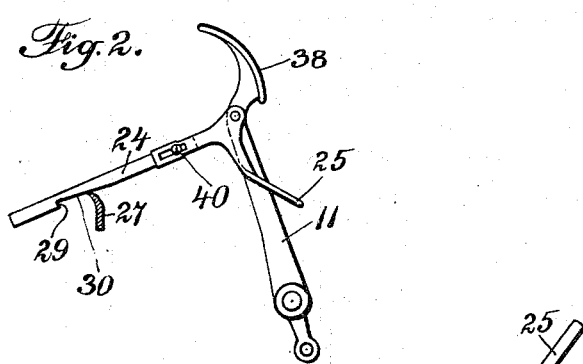
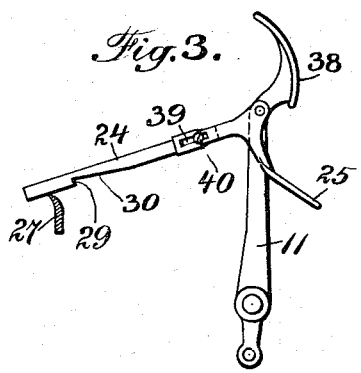
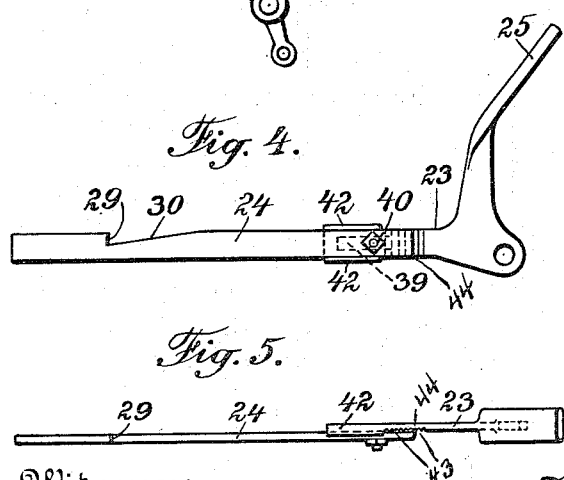
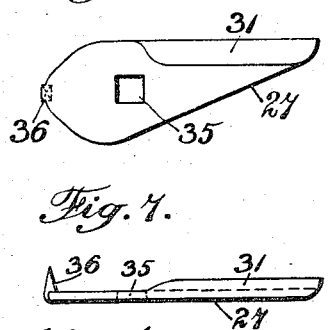
Witnesses:
E. Bernhardt
Washington Reiter
Adam Chambers, Inventor
By his Attorney Wm. J. Dolan

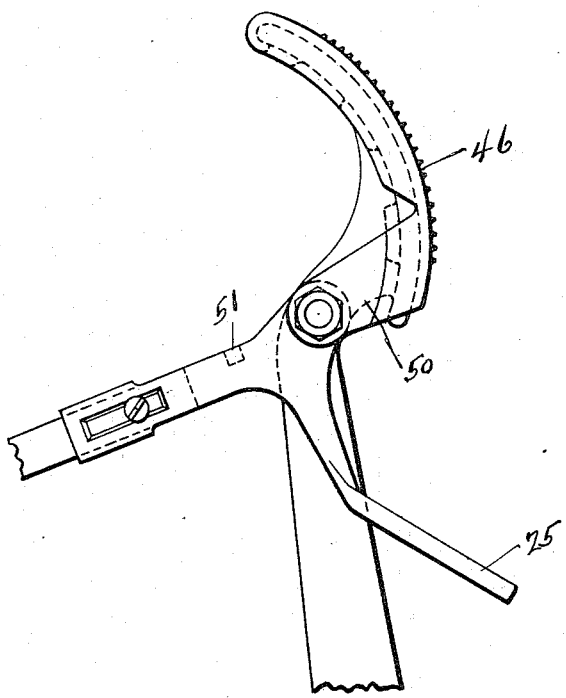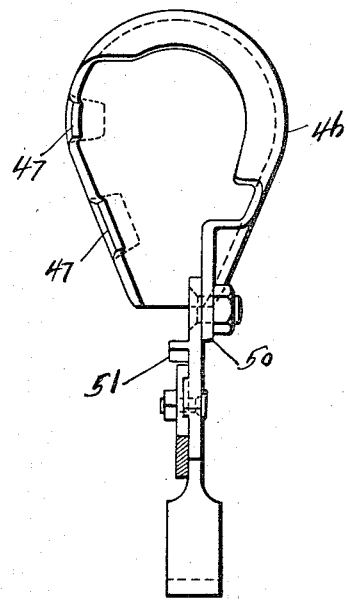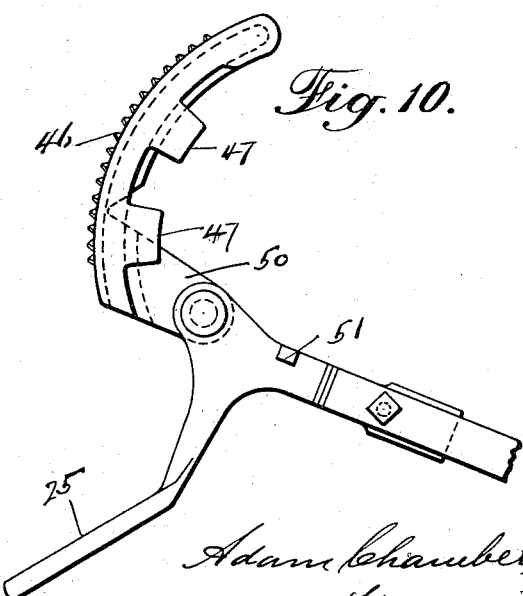

UNITED STATES PATENT OFFICE.

ADAM CHAMBERS, OF NEW YORK, N. Y.

CLUTCH-CONTROL MECHANISM.

1,244,468.  Specification of Letters Patent.  Patented Oct. 30, 1917.

Application filed March 31, 1915. Serial No. 18,244.

*To all whom it may concern:*

Be it known that I, ADAM CHAMBERS, a citizen of the United States, and a resident of New York city, Bronx county, and State of New York, have made certain new and useful Improvements in Clutch-Control Mechanism, of which the following is a specification.

The invention relates to automobiles and is intended primarily to provide a suitable controlling device for the transmission gearing thereof.

In some automobiles, for example, the Ford, the transmission gearing is of the planetary type, wherein the different gears are connected to the driving engine by means of friction bands or drums. In the form of mechanism employed in the Ford car, there is a spring which tends constantly to connect the high speed gear with the engine, which tendency is resisted and controlled either by a hand lever or a "foot pedal." The pedal is also adapted to effect the connection of the low speed gear, it being arranged so as to be movable in opposite directions from a neutral position to control either the high speed or the low speed gear. In order to operate the pedal for high speed, it is necessary to throw the hand lever forward, as the lever, while in its vertical position, serves to hold the high speed gear disconnected from the engine against the action of the spring. In other words, when the hand lever is in its vertical position the high speed gear is held permanently out of action and the pedal is allowed to control only the low speed gear; whereas, when the hand lever is in its forward position, the spring is allowed to connect the high speed gear unless this tendency is resisted and controlled by means of the pedal. When, therefore, the hand lever is in its forward position, the pedal is relied upon to control both speeds, it being movable backwardly and forwardly from a neutral position, as before stated, to control one or the other. It should be noted, however, that in such circumstances the spring tends constantly to move the pedal to its backward position for high speed, so that if the pedal be released when it is in either of its other two positions, namely, forward or neutral, the spring will immediately throw it to the rear for high speed. To bring the car to a stop the pedal must, of course, occupy its neutral position, when both gears will be disconnected. In practice, however, it is difficult to locate the pedal in its central or neutral position, as only a very limited range of movement of the pedal from the exact neutral center is possible without throwing the mechanism out of neutral, and especially as the spring is tending constantly to throw the pedal rearwardly. In short, the operator must rely almost entirely upon his own skill and experience to bring the pedal into its exact neutral position.

The dangers incident to such a construction will be obvious, on considering the liability to accident when the automobile is brought into a crowded thoroughfare. For instance, if the operator should accidentally remove his foot from the pedal, the latter will, under the influence of the spring, fly rearwardly and throw in the high speed gear, causing the car to jump forward suddenly with disastrous results. Such liability would be greatly increased in the case of an inexperienced operator, who not only might forget to hold the pedal in its neutral position, but who would undoubtedly find it difficult to place the pedal in such position.

The invention, therefore, is intended to obviate the objections above noted or any liability thereto, and in general to render the control of the transmission gearing easy, simple and certain and without possibility of accident. To this end, it is proposed to provide a stop device which will automatically arrest the pedal at its neutral position when released from its low speed position by the operator, and which device may be released at will by the foot of the operator to permit the pedal to be thrown rearwardly by the spring and thus bring into action the high speed gear.

Another object of the invention is to provide a device of the character described which shall be simple, durable and cheap in construction and easily applied, and yet positive and reliable in operation.

Other objects and the manner in which they are carried out will subsequently appear in the detailed description to follow and finally be pointed out in the claims.

The invention consists in the novel improvements, combinations, features of construction and parts herein shown and described.

Two embodiments of the invention are illustrated in the accompanying drawings which form part hereof, and which serve in connection with the description to explain the principles of invention.

Of the drawings:

Figure 1 is a view partly in side elevation and partly in section, showing an embodiment of the invention as applied to the transmission gear of an automobile of the Ford type;

Fig. 2 is a side elevation of a detail, showing the position of the pedal and certain other parts, when running at low speed;

Fig. 3 is a similar view, showing the positions of the said parts, when running at high speed;

Fig. 4 is a side elevation of a lever used in connection with the pedal and particularly illustrates means by which the said lever may be varied in size and adjustment and rendered positive in its action in any desired adjustment;

Fig. 5 is a plan view of the same;

Fig. 6 is a side elevation of a stop member coöperating with the said lever;

Fig. 7 is a plan view of the same; and

Fig. 8, 9 and 10 are detail views of a modification.

Referring now to the invention in detail, in the drawings is illustrated an embodiment of the invention as applied to a Ford automobile. Upon a shaft 10, which is operatively connected to the friction band for the low speed gear, is rigidly mounted a lever or pedal 11. Depending from the shaft 10 and rigidly affixed thereto is an arm 12 pivotally connected to a member 13, which in turn is pivotally connected to one end of a rocking lever 14, the latter being rigidly mounted upon a shaft 15. Rigidly connected to said shaft 15 and depending therefrom is an arm 16, which bears against a clutch collar 18, mounted upon the driving shaft 21 of the vehicle, and adapted through connections (not shown) to operate the friction band for the high speed gear. Surrounding the shaft 21 and bearing against the coller 18 is a spring 19, which tends constantly to shift the collar toward the left to apply the friction band to the high speed gear and thus to effect its operation by the driving shaft 21.

In Fig. 1 the pedal 11 is shown as occupying its neutral position, at which time the collar 18 will, through the connections described, be held in its neutral position with the high speed gear disconnected. Now, when the pedal is released, the spring 19 will shift the collar 18 to the left and connect the high speed gear, throwing the pedal to its rearward position. When, however, the pedal is moved to its vertical position, it will rotate the shaft 10 and connect the low speed gear, while at the same time the collar 18 will be shifted to the right and thus effect the disconnection of the high speed gear in the manner just described. In the usual construction, also, a hand lever, not shown, is connected to the clutch collar 18 and is normally maintained, say, in a vertical position with the collar 18 in its position to the right when the high speed gear is maintained permanently disconnected. In practice this hand lever is thrown forwardly in order to release the collar and thus allow it to be controlled exclusively by the pedal in the manner just described. In other words, when the hand lever is in its forward position the spring would instantly throw the high speed gear into action if other means were not provided. As previously stated, in order to prevent this, the operator must keep his foot upon the pedal so as to maintain it in neutral position, unless, of course, it is desired to proceed at high speed. This same tendency of the spring also exists when the pedal is held in its vertical position for low speed.

In the construction thus far described, moreover, it will be noted that if for any reason, as inadvertence or mistake, the foot of the operator be taken from the pedal 11, when the latter is at low speed, or neutral, the pedal will, under the influence of the spring 19, travel rearwardly and into high speed. Allusion has been made to the possible dangers which may result from this action.

A prime feature of the invention, therefore, consists in providing means to prevent this automatic rearward movement of the clutch lever or pedal 11 and to check and retain the pedal at neutral position. Preferably and as shown, this means comprises a foot lever 23 pivotally mounted upon said pedal 11 and having a long arm 24, and a short arm to which further allusion will be made. Also a stop member or detent 27 is arranged to coöperate with the long arm 24 of said foot lever 23 and preferably this stop 27 is fastened to the dashboard of the car at a suitable point. Further reference to the stop will presently be made. When the pedal 11 is moved forward to low speed, see Fig. 2, the arm 24 of the foot lever will slide upon, but not engage, the stop member or detent 27. When the operator removes his foot from the pedal, however, and the pedal then moves rearwardly in the direction of high speed, the arm 24 of the foot lever will slide upon said detent 27 a certain predetermined distance, and then engage the stop with the wall 29 formed by cutting a recess in the underside of the arm 24. A sloping approach 30 to the wall 29 lends efficiency and certainty to the checking operation, as clearly shown in the drawings. It will be noted that the position of the wall 29 in the arm 24 is determined so that when the stop 27 is engaged by said wall, the pedal 11 will be at neutral. The stop member 27 is also so constructed, see Fig. 6, with its shoulder 31 slanting from the vertical, that it will engage said wall 29 easily and securely without any chance of the arm 24 slipping from its engagement with the stop. The stop member 27 is fashioned with an aperture 35 therethrough so that it can be engaged by a bolt in the motor, and by means of a pin 36 the stop can be more rigidly secured in place.

Another feature of the invention consists in providing means for releasing the clutch lever or pedal 11 when it is held at neutral by the engagement of the arm 24 of the foot lever 23 with the stop or detent 27, and preferably and as shown, this releasing means consists of the short arm 35 of said foot lever 23. It will be noted that a slight pressure upon the said short arm 35 will serve to release said arm 24 from its engagement with the stop, and furthermore it will be noted that said arm is in very convenient position with relation to the pad 38 of the pedal 11 so that the operator may without releasing his hold upon said pad 38 and merely by pressing with his heel upon said short arm 35 lift the long arm 24 from its engagement with the detent 27, and thus allows the pedal to be moved rearwardly by the spring 19 for high speed.

Another feature of the invention relates to the means provided for varying the length of the arm 24 of the foot lever 23 and thus rendering the arm capable of adjustment to variant conditions of service. In the embodiment illustrated the arm 24 is made of two members, each member having a longitudinal recess 39 formed therein, and a bolt passes through both said recesses and is fastened by a nut 40. It will be seen that the length of the arm 24 may be varied by varying the relative longitudinal positions of the two members of the arm and that this variation may be nearly co-extensive with the common length of the recesses 39. To prevent relative lateral disarrangement of the members of the arm 24 flanges 42 are provided, see Figs. 4 and 5. Preferably also grooves 43 are formed in one of the members, preferably the shorter member, of the arm 24 and at right angles to its length, the other member, in this instance the longer one, having a flange 44 arranged at its end to fit in one of said grooves, the coöperative effect of the groove and flange being evident.

In the embodiment of the invention thus far described the foot lever 23 is pivoted directly upon the clutch lever or pedal 11, and this requires the drilling of an orifice in said pedal in which to arrange the pivot. It is desirable, however, to provide a form of the device of such character that the existing controlling mechanism of this type may be arranged in accordance with the principles of this invention, and to this end that the foot lever may be arranged upon the pedal almost instantly and by the least experienced, and so of course without the necessity on the part of the user of drilling holes, or in any way requiring the services of a person skilled in such work.

In the preferred embodiment of the invention, therefore, a member 46 is provided which may be likened to a slipper and which fits upon and is securely fastened to the pedal 11 in the fashion of the slipper, being for this purpose provided with depending flanges 47, which, being formed of a suitable soft material as malleable iron, may be bent inwardly and thus securely clamp the slipper to the pad.

As furnished to the user, the foot lever in this embodiment of the invention is pivotally mounted upon the arm 50 depending from the slipper, see Fig. 10, and the lever is preferably prevented from undue oscillation by a detent 51 arranged at a suitable point on the lever 23.

It will be seen that a clutch control constructed in accordance with the invention carries out the objects of the invention as heretofore enumerated and set forth, while possessing other advantages which will be apparent to those skilled in the art.

The invention in its broader aspects is not limited to the precise construction shown and described nor to any particular construction by which it has been or may be embodied, as many changes may be made in the details without in any way departing from the main principles of the invention or sacrificing its chief advantages.

I claim:

1. In a clutch control mechanism, the combination of a pedal movable in opposite directions from a neutral position to control different clutches, and means permitting free movement of the pedal back and forth between its neutral position and one of its extreme positions, but operative automatically at all times until released by the foot of the operator to hold the pedal against movement between its neutral position and its other extreme position, and to arrest the pedal at neutral position when said pedal is released while in its first said extreme position.

2. In a clutch control mechanism, the combination of a pedal movable in opposite directions from a neutral position to control different clutches, and means permitting free movement of the pedal back and forth between its neutral position and one of its extreme positions, but operative automatically at all times until released by the operator to hold the pedal against movement between its neutral position and its other extreme position and to arrest the pedal at neutral position when said pedal is released while in its first said extreme position, said means being releasable by the foot of the operator to permit the free movement of the pedal in either direction.

3. In a clutch control mechanism, the combination of a pedal movable forwardly and backwardly from a neutral position to control different clutches, a spring tending constantly to move the pedal to its rearmost position, and means for holding the pedal in its neutral position against the action of such spring, said means permitting the free movement of the pedal back and forth between said neutral position and its foremost position and acting automatically at all times until released by the foot of the operator to arrest the pedal in its neutral position when released while in its forward position.

4. In a clutch control mechanism, the combination of a pedal movable forwardly and backwardly from a neutral position to control different clutches, a spring tending constantly to move the pedal to its rearmost position, and means for holding the pedal in its neutral position against the action of such spring, said means permitting the free movement of the pedal back and forth between said neutral position and its foremost position and acting automatically at all times until released by the operator to arrest the pedal in its neutral position when released while in its forward position, and foot-operated means for disengaging the holding means at will to allow the pedal to move rearwardly under the action of the spring.

5. In a clutch control mechanism, the combination of a pedal movable forwardly and backwardly from neutral position to control different clutches, and a spring tending constantly to move the pedal to its rearmost position, with a latch pivotally mounted upon said pedal, so as to be movable therewith, and a fixed stop engaged by the latch, the said latch and stop being arranged to permit the free movement of the pedal back and forth between its neutral and forward positions but acting automatically to arrest the pedal in its neutral position when released, at the forward position.

6. In a clutch control mechanism, the combination of a pedal movable forwardly and backwardly from neutral position to control different clutches, and a spring tending constantly to move the pedal to its rearmost position, with a latch pivotally mounted upon said pedal, so as to be movable therewith, and a fixed stop engaged by the latch, the said latch and stop being arranged to permit the free movement of the pedal back and forth between its neutral and forward positions but acting automatically to arrest the pedal in its neutral position when released at the forward position, and the said latch being provided with a foot pad to permit it to be disengaged from the fixed stop by the operator when it is desired to allow the pedal to be moved rearwardly by the spring.

7. In a clutch control mechanism, the combination of a pedal movable forwardly and backwardly from neutral position to control different clutches, and a spring tending constantly to move the pedal to its rearmost position, with a latch pivotally mounted upon said pedal so as to be movable therewith and a fixed stop engaged by the latch, the said latch and stop being arranged to permit the free movement of the pedal back and forth between its neutral and forward positions but acting automatically to arrest the pedal in its neutral position when released at the forward position, together with foot-operated means for disengaging the latch from the fixed stop at will to permit the pedal to be moved rearwardly under the action of the spring.

8. In a clutch control mechanism, the combination of a pedal movable forwardly and backwardly from a neutral position to control different clutches, and automatic means releasable by the foot of the operator for holding the pedal in its neutral position with both clutches disengaged, the said means being operative only when the pedal is in its neutral position, but being operative always when the pedal is moved to such position, as when passing from low to high position.

9. In a clutch control mechanism, the combination of a pedal movable forwardly and backwardly from a neutral position to control different clutches, with means for holding the pedal in its neutral position, the said means comprising a fixed stop and a latch to engage the stop, together with a supporting member to which the latch is connected and which is fashioned to fit over the pad portion of the pedal to permit its ready attachment to or detachment from said pedal.

10. In a clutch control mechanism, the combination of a pedal movable forwardly and backwardly from a neutral position to control different clutches, a fixed stop to hold the pedal in its neutral position with both clutches disengaged, and an automatic latch carried by the pedal and pivoted upon a transverse axis so as to be movable vertically with reference to the pedal, the said latch being provided with a rearwardly extending portion arranged in juxtaposition to the pad portion of the pedal and substantially in the same vertical plane therewith, whereby the latch may be readily disengaged by the foot of the operator without having to take his foot from the pedal and while the pedal is in any of its different positions.

In testimony whereof, I have signed my name to this specification, in the presence of subscribing witnesses.

ADAM CHAMBERS.

Witnesses:
Mrs. FABER,
CHARLES F. FABER,
JAMES H. LEDDY.